United States Patent
Hundt et al.

(10) Patent No.: US 10,532,692 B2
(45) Date of Patent: Jan. 14, 2020

(54) ILLUMINATED TRIM FITTING

(71) Applicants: Dura Automotive Holdings U.K., Ltd, Birmingham (GB); DAIMLER AG, Stuttgart (DE)

(72) Inventors: Torsten Hundt, Neuenrade (DE); Karl-Heinz Adis, Rottenburg (DE); Ralf Giessler, Böblingen (DE); Illdiko Gössl, Stuttgart (DE); Joaquin Rodrigo Pastor, Tübingen (DE); Björn Storz, Sindelfingen (DE); Denis Tisljar, Stuttgart (DE); Margit Veeh, Ulm (DE); Michael Wirsing, Gechingen (DE); Jan Stegemann, Neuenrade (DE); Stephan Röhner, Dortmund (DE)

(73) Assignee: DURA OPERATING, LLC, Auburn Hills, MI (US)

( * ) Notice: Subject to any disclaimer, the term of this patent is extended or adjusted under 35 U.S.C. 154(b) by 78 days.

(21) Appl. No.: 15/542,815

(22) PCT Filed: Jan. 12, 2016

(86) PCT No.: PCT/DE2016/100011
§ 371 (c)(1),
(2) Date: Jul. 11, 2017

(87) PCT Pub. No.: WO2016/112897
PCT Pub. Date: Jul. 21, 2016

(65) Prior Publication Data
US 2018/0001815 A1  Jan. 4, 2018

(30) Foreign Application Priority Data
Jan. 12, 2015 (DE) .......... 10 2015 100 327

(51) Int. Cl.
*B60Q 1/26* (2006.01)
*B60J 10/265* (2016.01)
(Continued)

(52) U.S. Cl.
CPC .......... *B60Q 1/2661* (2013.01); *B60J 10/265* (2016.02); *B60J 10/34* (2016.02); *B60J 10/36* (2016.02);
(Continued)

(58) Field of Classification Search
None
See application file for complete search history.

(56) References Cited

U.S. PATENT DOCUMENTS

2005/0068785 A1* 3/2005 Takeda ................... B60Q 1/323
362/506
2009/0134661 A1* 5/2009 Sugiura .................. B60J 5/0411
296/146.9

(Continued)

FOREIGN PATENT DOCUMENTS

DE 19828108 A1 1/1999
DE 10033774 A1 1/2002
(Continued)

*Primary Examiner* — Andrew J Coughlin
(74) *Attorney, Agent, or Firm* — Raymond J. Vivacqua; Steven L. Crane

(57) ABSTRACT

An illuminated trim fitting for a motor vehicle, in particular a trim fitting as a cover fitting of a sealing strip for the window channel of a vehicle door, is intended to provide a high-quality illuminating effect accompanied at the same time by a simple structural design, low manufacturing costs and space-saving means of attachment. In addition, the trim fitting is to differ as little as possible externally from non-illuminated trim fittings. For this purpose there is provision that a light gap is formed between a profiled strip of the trim fitting and the adjacent vehicle outer skin, through (Continued)

Figure 1:
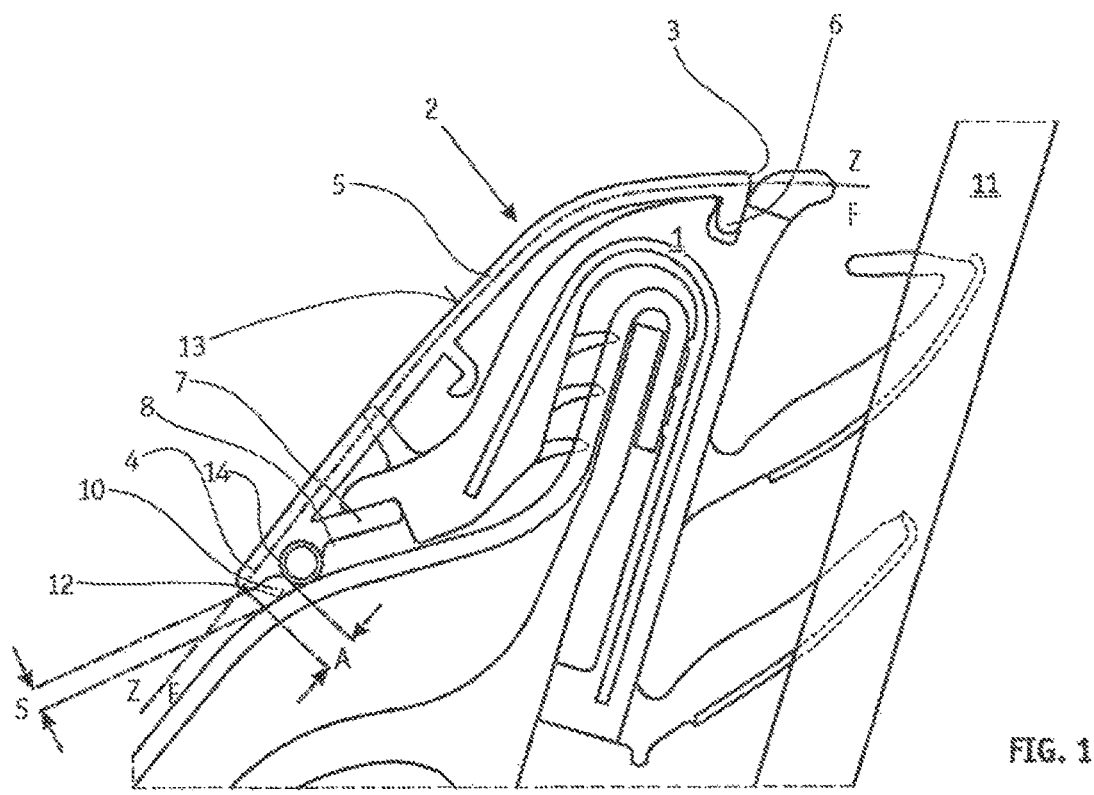

which light gap the light emitted by an optical waveguide provided on the rear of the trim fitting can exit to the outside.

20 Claims, 1 Drawing Sheet

(51) Int. Cl.
- *B60R 13/04* (2006.01)
- *B60J 10/75* (2016.01)
- *F21S 43/237* (2018.01)
- *B60J 10/34* (2016.01)
- *B60J 10/36* (2016.01)
- *B60J 10/70* (2016.01)
- *B60Q 1/32* (2006.01)
- *B60R 13/06* (2006.01)
- *F21V 8/00* (2006.01)

(52) U.S. Cl.
CPC .............. *B60J 10/70* (2016.02); *B60J 10/75* (2016.02); *B60Q 1/26* (2013.01); *B60Q 1/268* (2013.01); *B60Q 1/323* (2013.01); *B60R 13/04* (2013.01); *B60R 13/06* (2013.01); *F21S 43/237* (2018.01); *G02B 6/001* (2013.01)

(56) References Cited

U.S. PATENT DOCUMENTS

| | | | |
|---|---|---|---|
| 2012/0297726 A1 | 11/2012 | Ellis et al. | |
| 2013/0135880 A1* | 5/2013 | Michie | B60Q 1/2611 |
| | | | 362/459 |
| 2013/0229820 A1* | 9/2013 | Jutila | B60Q 1/323 |
| | | | 362/545 |
| 2013/0301286 A1 | 11/2013 | Moussa | |
| 2014/0240988 A1* | 8/2014 | Del Pozo Gonzalez | |
| | | | B60Q 3/64 |
| | | | 362/282 |
| 2016/0016506 A1 | 1/2016 | Collins et al. | |
| 2016/0236613 A1* | 8/2016 | Trier | B60R 13/04 |

FOREIGN PATENT DOCUMENTS

| | | |
|---|---|---|
| DE | 102011106318 A1 | 1/2013 |
| DE | 202013008321 U1 | 11/2013 |
| DE | 102014015186 A1 | 4/2015 |
| EP | 2298607 A2 | 3/2011 |
| EP | 2363324 A1 | 9/2011 |
| WO | 2015154972 A1 | 10/2015 |

\* cited by examiner

ILLUMINATED TRIM FITTING

CROSS REFERENCE TO RELATED APPLICATIONS

This application is a national stage application under 35 U.S.C. 371 of PCT Application No. PCT/DE2016/100011 having an international filing date 12 Jan. 2016, which PCT application claimed the benefit of German Patent Application No. 20 2015 100 329.7 filed 12 Jan. 2015, the entire disclosure of each of which are hereby incorporated herein by reference.

The invention relates to an illuminated trim fitting for a motor vehicle, in particular a trim fitting as a cover fitting of a sealing strip for the window channel of a vehicle door, and to a trim fitting arrangement on a vehicle, to a motor vehicle having such a trim fitting arrangement, and also to a sealing profile and to a profiled strip. The trim fitting comprises a profiled strip which, given correct final mounting on the vehicle, defines a decorative side which is directed away from the vehicle and which has an externally visible decorative surface of the profiled strip, and a functional side which is directed towards the vehicle and is not visible externally, and wherein a lighting means is provided in the form of an optical waveguide, which is arranged on the functional side after correct final mounting, in order to backlight at least part of the profiled strip given correct final mounting on the vehicle.

It is known to provide trim fittings for motor vehicles with lighting means in order to give the vehicle a more high-quality appearance.

German laid-open patent application DE 10 2008 027 128 A1 discloses a cover fitting or sealing strip fora motor vehicle having a profiled strip into which an LED for illuminating a trim element arranged on the outer surface or a cover layer provided on the outer surface is embedded. However, the structure is comparatively complex and costly to manufacture and furthermore does not permit any continuously uniform illumination over the entire length of the fitting because of the LEDs which are provided only at discrete positions. Furthermore, it is considered disadvantageous that the cover fitting or sealing strip can be identified from the outside as an illuminated fitting owing to its external design.

DE 10 2006 049 872 A1 discloses a trim fitting having an illumination module which is let into the trim fitting as a separate component. The illumination module permits only a restricted illumination range, and the design of the trim fitting is complex as a result of the need for fitting a cutout into the trim strip. An additional factor here is also that this type of design of a trim fitting compromises the high-quality visual effect because the visible surface of the trim fitting is penetrated.

A likewise multi-component trim fitting of complex design with integrated lighting means is also disclosed by document EP 2 063 057 A1.

EP 1 772 667 A2 discloses a plastic component with an integrated light source. In this context, the light elements are embedded at least partially in the plastic moulded mass of a visible part, which considerably complicates the manufacture of the plastic component. Furthermore, the trim fitting has to be fabricated from plastics which can be through-lit, which can give a less high-quality impression compared to other materials.

The last-mentioned disadvantage of the restricted material selection also relates to the illuminated trim fittings which are disclosed in documents EP 2 556 996 A2 and EP 2 363 324 A1.

A fitting having a through-lit, transparent fitting part is also disclosed by U.S. 2003/0002294 A1. In order to prevent the lighting means from being visible from the outside, said lighting means emits light laterally into the transparent fitting part and is covered by an additional cover which can be seen from the outside. This design is relatively complex and requires additional components and does not permit any fittings which are very flat and narrow in design. Document DE 201 10 352 U1 describes a completely comparable and therefore also similarly disadvantageous design.

The object of the invention is therefore to make available a trim fitting of the type specified at the beginning and a motor vehicle having a trim fitting which is of structurally simple design and can be manufactured cost-effectively. The trim fitting should also be flat in design and be capable of being mounted in a space-saving fashion, but nevertheless be able to give a visually high-quality impression compared to the known trim fittings which are provided with lighting means, and said trim fitting should differ externally as little as possible, or even not at all, from non-illuminated trim fittings. In addition, the trim fitting should permit the use of non-transparent materials.

This object is achieved according to the invention in that the trim fitting is designed here in such a way that, given correct final mounting on the vehicle, a light gap is formed between the trim fitting and the adjacent vehicle outer surface, in particular between the profiled strip and the adjacent vehicle outer surface, through which light gap the light emitted by the optical waveguide is capable of exiting to the outside in a visible fashion.

The lighting means which is provided is an optical waveguide which, given correct final mounting, extends on the functional side along at least part of the profiled strip, wherein the optical waveguide is arranged outside the profiled strip cross section and does not penetrate it.

With this configuration, it becomes superfluous to embed lighting means in the profiled strip, and the need to use materials which can be through-lit (transparent or translucent) can be eliminated, wherein the use of translucent or transparent profiled strips is still of course possible. In addition to transparent or translucent materials, high-quality metal strips, which cannot be through-lit, can also be used, which metal strips effectively visually conceal assembly components which are located on the functional side of the profiled strip, in particular the lighting means or the optical waveguide itself. A component which increases the material homogeneity of the profiled strip is not necessary. The profiled strip is also not penetrated by a component, for instance the optical waveguide, in a way which is visible from the outside.

The light beams are generated on the side of the profiled strip facing away from the decorative side (on the functional side), back-light the trim fitting, in particular the profiled strip, and exit towards the outside from the rear through the gap present between the adjacent vehicle outer surface and the trim fitting, which gap is illuminated by the emitted light. This generates indirect illumination through the trim fitting, which illumination can extend uniformly over the length of the trim fitting given an appropriate arrangement of the optical waveguide. In the final-mounted state, the trim fitting cannot be differentiated externally from other, non-backlit trim fittings. Only a small shadow gap, which serves as a light gap when the lighting means is switched on, may be perceptible, the width of which shadow gap can, given skillful dimensioning, be kept so small that it is visually insignificant.

The vehicle outer surface is the external surface of the vehicle which is adjacent to the trim fitting in the region of the light gap and which bounds the light gap together with the trim fitting. This can be, in particular, the coated surface of the outer skin of the vehicle bodywork which adjoins the profiled strip, that is to say in particular the coated sheet metal of the vehicle bodywork. If other parts—for example a limb of a sealing profile onto which the trim fitting is fitted—project between the trim fitting or the profiled strip and the sheet metal of the vehicle bodywork, the vehicle outer surface can also be formed by the surface of these parts.

The optical waveguide is arranged on the side of the profiled strip facing away from the decorative side (on the functional side), but is located outside the profiled strip cross section which is determined by the profiled strip, and is therefore in particular not embedded in the profiled strip cross section. It can be provided that the optical waveguide is held on the external surface of the profiled strip on the functional side of the profiled strip. However, it can alternatively also be provided that the seal which is arranged on the motor vehicle bears the optical waveguide or said optical waveguide is attached to the vehicle outer surface, on the functional side of the trim fitting.

The profiled strip is preferably composed of a single homogenous material. The material can be not only metals which are usually used for trim fittings, such as aluminium or (stainless) steel, but also, in particular, thermal plastics, for example PMMA, SAN, PC or ABS.

In one advantageous embodiment, the profiled strip cross section has a main limb whose outwardly directed surface forms the externally visible decorative surface. Protruding from this main limb are preferably one or more functional limbs with which the profiled strip interacts with a sealing profile which bears the latter. In particular it can be provided that the functional limbs engage in the sealing profile in order to be held thereon.

The optical waveguide can be arranged on the main limb or on a functional limb on the rear of the functional side. Irrespective of whether the optical waveguide is arranged on the main limb or on a functional limb there can be provision that a mount for the optical waveguide is provided on the limb of the profiled strip which bears the optical waveguide. This mount can be embodied in such a way that the optical waveguide can be clipped in a latching fashion into the mount or bonded therein, if appropriate including a sheath which surrounds the optical waveguide. Such a mount can be formed, in particular, by a receptacle groove which extends along the profiled strip. However, in the event of the sealing profile which bears the profiled strip or some other component which is adjacent to the profiled strip bearing the optical waveguide, such a mount can also be provided in this component in a comparable fashion.

The lighting means can, for example, be arranged on the functional limb which is at the bottom given correct installation and which, in one advantageous embodiment, extends inwards towards the seal from a bend in the course of the material which forms the lower visible edge of the main limb and encloses an acute angle, after correct final mounting on the vehicle. That side of this functional limb located on the functional side of the profiled strip which is directed towards the vehicle outer surface bears the optical waveguide in one preferred embodiment. However, it can also be provided that the optical waveguide is held on the rear of the main limb.

The light gap through which the light emitted by the optical waveguide is intended to exit to the outside is defined, in particular by the distance of the lowest visible edge of the main limb which forms the decorative surface from the adjoining vehicle outer surface.

In order to keep the width of the light gap constant over the entire strip length of the typically thin-walled, and therefore per se flexible, profiled strip, there can be provision that the optical waveguide which is arranged between the profiled strip and the vehicle outer surface functions, if appropriate together with a sheath which is to be considered part of the waveguide, by virtue of the fact that the profiled strip is supported indirectly or directly via the optical waveguide on the vehicle outer surface. As a result, the light gap width can be defined, and there is no risk of the light gap width varying over the length of the strip owing to fabrication inaccuracies or other material distortion. Being directly supported means in this context that the optical waveguide is directly in contact with the profiled strip and the vehicle outer surface in order to define the distance of the profiled strip from the vehicle outer surface in the region of the light gap. Being indirectly supported means in this context that at least part of a further component, for example part of a sealing profile, projects between the optical waveguide and the profiled strip and/or between the optical waveguide and the vehicle outer surface, but the optical waveguide is integrated into the components which together define the distance between the profiled strip and the vehicle outer surface, in such a way that said optical waveguide also determines the distance. In the case of indirect support, a spacer element which is separate from the sealing profile can also be provided, on which spacer element, in particular, the limb of the profiled strip cross section which bears the optical waveguide is indirectly supported via the optical waveguide. This spacer element can also be fabricated from a transparent material, with the result that, in particular, when the optical waveguide itself is supported on this spacer element, the emitted light can be directed through the spacer element to the light gap.

In particular (optical) glass fibres or acrylic fibres can be considered as light-directing material or as a light-directing line for the optical waveguides. The optical waveguide can comprise here fibre bundles or be formed by a single, largely homogenous line of material.

The cross section of the optical waveguide is preferably round. Depending on the structural conditions of the individual case, the optical waveguide can, however, also have other cross-sectional shapes.

The optical waveguide can have a transparent or translucent sheath. This may be, in particular, a sheath made of a suitable plastic, for example made of polypropylene and/or polyethylene.

Such a sheath can serve as a protective sheath, which protects the internal line of the optical waveguide which guides the light and is often sensitive to fractures or impacts, effectively against the influences of the weather and against damage. Furthermore, such a protective sheath can serve to prevent the outer skin of the vehicle from being damaged by the, under certain circumstances, hard or even aggressively acting material of the optical waveguide which guides the light, in particular when the optical waveguide is in direct contact with the outer skin of the vehicle.

Furthermore, such a sheath can be provided as a sheath of the material of the optical waveguide which guides the light, said sheath determining the cross section and permitting the assembly composed of the light-guiding material or inner line of the optical waveguide and the sheath of the optical waveguide to be given a largely free cross-sectional shape which differs from the cross-sectional shape of the material or the inner line of the optical waveguide which guides the light. In this way, a light-guiding material which can be manufactured, for example, only with a round cross section owing to the material can be embedded in a sheath having a rectangular cross section, with the result that a rectangular optical waveguide is obtained as an assembly.

In addition, such a transparent or translucent sheath can perform the function of a sheath which influences the light beam in that the sheath is designed, for example, to cause light to pass through in a coloured and/or milky fashion and in this way influences the property of the emitted light. It is therefore possible to ensure a specific colour of light through a sheath which influences the light beam or to ensure that a particularly diffuse, soft or rather clear, directional emission of light occurs.

A sheath which influences the light beam can also be formed by virtue of the fact that regions which are not translucent are formed at locations at which lateral exiting of light from the line of the optical waveguide which guides the light is not desired. In this way, for example, a reflective coating can be provided on part of the outer surface of the sheath, which coating reflects back into the optical waveguide light beams which "want" to exit the optical waveguide laterally in this part. This can increase the light yield at the locations at which exiting of the light from the optical waveguide is desired.

A further advantage of the invention described above is that the actual generation of the light can be carried out by means of a light source inside the vehicle bodywork. It is therefore possible for an LED or some other suitable light source whose emitted light is fed into the optical waveguide at a central location, lying, in particular, in the passenger compartment of the vehicle, to be provided, for example, in the inner region of a door, in the passenger compartment of the vehicle or in some other dry space of the vehicle which is protected against external moisture and influences of the weather, wherein the light which is emitted by the light source is then guided outward via the optical waveguide. The light can be fed into the optical waveguide via plug-type connections which are known per se in the prior art. In this context it is particularly advantageous that there can be a largely free selection of the size and power of the light source, while the lighting elements which are to be provided outside the vehicle bodywork in the region of the trim fitting do not take up any appreciable amount of installation space.

In order to be able to allow the light to exit laterally from the optical waveguide, interference points at which the light which is propagating in the optical waveguide is deflected are provided in the optical waveguide, with the result that said light can exit laterally from the optical waveguide and, when a sheath is present, can exit from the transparent region of the sheath, in order to back-light the profiled strip. Such interference points can be formed from, in particular, metallic extraneous particles which are embedded into the optical waveguide and which are selectively introduced into the waveguide material when the waveguide is manufactured. Such interference points have the effect that the light which is fed into the optical waveguide does not remain "caught" therein but instead the light appears to shine out of the optical waveguide.

Figure 2:
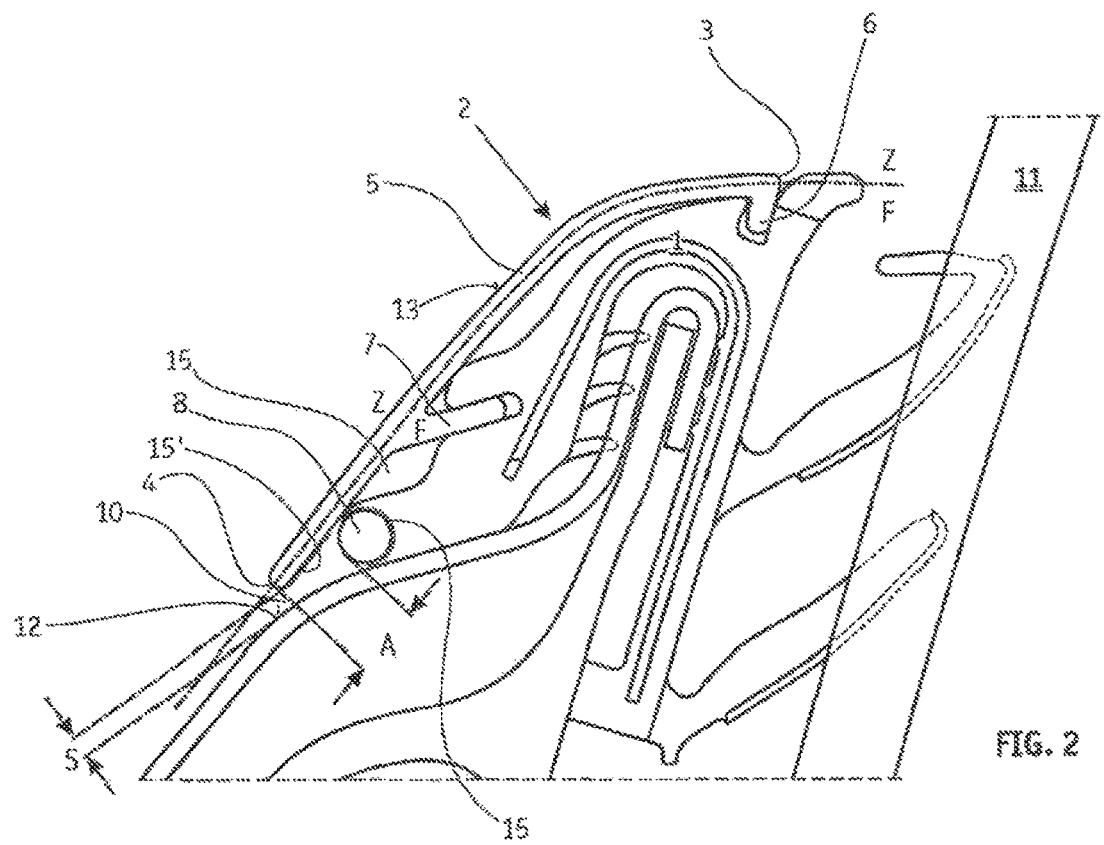

Further features and advantages of the invention can be found in the dependent claims and the following description of preferred exemplary embodiments with reference to the drawings, in which:

FIG. 1 shows a trim fitting attached to a sealing profile, according to a first embodiment, FIG. 2 shows a trim fitting attached to a sealing profile, according to a second embodiment.

FIG. 1 illustrates a profiled strip 2, in the form of a window channel covering fitting, which is attached to a sealing profile 1. A further use would be, for example, a shoulderline trip strip or a cover strip for covering, for example, the A column, B column or C column. The sealing profile 1 is fitted with its U-shaped section, reinforced by an inserted metal bar, onto a vehicle bodywork part of a motor vehicle and seals off the door well from the window pane 11. The profiled strip 2 is configured to cover this sealing profile 1 and to conceal it as a decorative part in a way which gives the most high-quality visual impression possible. For this purpose, the profiled strip 2 or the profiled strip cross section formed by the material of the profiled strip 2 has an arcuate main limb 5, the outwardly pointing surface of which forms the decorative surface 13 of the profiled strip 2 which is externally visible given correct mounting. The decorative surface 13 is bounded by an upper visible edge 3 and a lower visible edge 4. In the region of these visible edges 3, 4, the main limb 5 bends inward and forms an upper functional limb 6 and a lower functional limb 7, by means of which functional limbs 6, 7 the profiled strip 2 engages in the sealing strip 1 in order to be held thereon. The dot-dashed line running along the main limb in the figures is intended to illustrate the boundary between the decorative side Z and the functional side F.

The trim fitting has an optical waveguide 8 as lighting means in addition to the preferably materially homogenous profiled strip 5. Said optical waveguide is held directly by the surface of the lower functional limb 7 facing the vehicle outer surface 12 and in particular is connected to the profiled strip 2 by clipping-in or bonding. The profiled strip 2 or the lower functional limb 7 of the profiled strip therefore serves as a carrier for the optical wavelength 8.

The profiled strip 2 is preferably manufactured from a non-translucent material, with the result that assembly components lying on the functional side F (in the figures those which are essentially to the right of the main limb 5), that is to say in particular the sealing strip 6 and the optical wavelength 8, cannot be seen from the outside through the profiled strip or are effectively covered by the profiled strip 2.

It is apparent that a gap with a gap width S, which can be perceived as a shadow gap when the optical waveguide 8 is not active or is switched on, remains between the surface of the lower functional limb 7 which is directed towards the vehicle outer surface 12, and the vehicle outer surface 12, or between the lower visible edge 4 and the vehicle outer surface 12. However, after the optical wavelength 8 has been activated or switched on it directly illuminates the vehicle outer surface and a large part of the emitted light passes through the gap, acting now as a light gap 10, towards the outside. As a result, indirect illumination is produced which has a high-quality appearance and is emitted mainly downwards, effectively preventing persons from being dazzled when they get in or out of the vehicle.

In FIG. 1 it is also apparent that the lower functional limb 7 of the profiled strip 2 is supported directly via the optical waveguide 8 held thereon on the vehicle outer surface 12 and therefore the profiled strip 2 is held at a defined distance from the vehicle outer surface 12 by means of the optical waveguide 8. The optical waveguide 8 therefore forms, together with its sheath 14 which surrounds the light-guiding line of the optical waveguide 8, a spacer element which ensures the uniform spacing of the profiled strip limb bearing the optical waveguide 8 from the vehicle outer surface 12, thereby ensuring a constant light gap width over the length of the profiled strip. The light gap width S is preferably in the range between 1 mm and 4 mm, particularly preferably between 2 mm and 3 mm. Depending on the light yield of the respectively used structure and according to the luminosity, light gap widths S below 1 mm are also possible. The shortest distance A between the outer surface of the optical waveguide 8 and the visible edge 4 is preferably at maximum 5 mm.

The optical waveguide mount which extends along the profiled strip 2 and is preferably provided in the profiled strip 2 itself is, for example, embodied as a receptacle groove which surrounds the optical waveguide 8 and into which the optical waveguide 8 can be pressed in a latching fashion when it is mounted together with the sheath 14, if one is provided. This way of configuring the optical waveguide mount permits particularly simple integration of the mount into the profiled strip 2 directly during the manufacture of the profiled strip, for example using an extrusion process or extrusion moulding process. Other types of mount can, of course, also be considered.

The profiled strip 2 shown in FIG. 2 differs from the profiled strip shown in FIG. 1 essentially in the different shape of the profiled strip cross section and the arrangement of the optical waveguide 8. The optical waveguide 8 is not directly held on the profiled strip 2 but rather in the sealing profile located on the functional side F of the profiled strip 2.

In order to ensure, even in the case of the embodiment of the profiled strip 2 shown in FIG. 2, that the light gap 10 which extends along the profiled strip 2 is kept constant, the waveguide 8 is also integrated decisively here into the chain of the components on which the profiled strip 2 is supported and by means of which the light gap width S is kept constant.

This arrangement ensures, as also in the embodiment shown in FIG. 1, a uniquely defined positioning of the optical waveguide 8 within the trim fitting arrangement, that is to say in particular inside the arrangement of the profiled strip 1, sealing profile 1, light gap 10 and bodywork outer surface 12. This in turn avoids a non-parallel profile of adjacent components, which could result in the light gap 10 being illuminated with different intensities.

The optical waveguide 8 is received in a mount provided in the sealing profile 1 in the embodiment shown in FIG. 2, said mount being formed as in the case of the profiled strip in FIG. 1 by a receptacle groove which extends along the sealing profile 1. This receptacle groove engages around the optical waveguide 8 here. In contrast to FIG. 1, this no longer causes the optical waveguide 8 itself to be in direct contact with the vehicle outer surface 12 and the rear surface of the profiled strip 2 but instead causes the material of the sealing profile 1 to be so. The profiled strip 2 is nevertheless supported indirectly on the optical waveguide 8 because the latter continues to be decisively integrated into the chain of the components defining the light gap width S. A sheath 14, provided if appropriate, of the optical waveguide 8, as shown in FIG. 1 and also conceivable for the exemplary embodiment in FIG. 2, then no longer has any effect as a protective sheath.

FIG. 2 also illustrates the possibility of providing a reflection surface 15 on the surface region of the sealing profile which faces the optical waveguide 8. The reflection surface 15 is, as shown in FIG. 2, preferably arranged at the side of the optical waveguide facing away from the light gap 10.

This reflective surface 15 can be formed by an applied reflective film or a coating which is vapour-coated or sputtered on, for example. The reflective surface 15 which is produced as a result increases the light yield in that the light emitted by the lighting means, which is predominantly incident on this reflective surface 15, is more effectively diverted towards the light gap, such that the proportion of the total light output which actually exits the light gap 10, is increased.

As an alternative to, or in addition to, the arrangement of the reflective surface 15 on the sealing profile 1, such a reflective surface can, of course, also be provided on the optical waveguide 8 itself, in particular insofar as the latter has, as shown in FIG. 1, a sheath which can be particularly suitable to be provided with a reflective coating on the outside.

Although the reflective surface is shown exclusively directly adjoining the optical waveguide 8 in FIG. 2, a use of such a reflective surface on other components is also conceivable in so far as they have a surface which serves as a reflective surface in the fashion described above. Consideration should be given, for example, to the additional reflective coating 15', on the rear of the main limb 5, shown in FIG. 2.

By virtue of the above-mentioned measures, the light yield (the proportion of the light emitted by the lighting means which actually exits the light gap) can be improved or a lighting means with a relatively low power can be used with a comparable light yield.

The lighting means 8 does not necessarily have to be an optical waveguide 8 which extends over the entire trim fitting. Depending on the application, the optical waveguide 8 can also extend over just part of the length of the trim fitting or it is possible to provide a plurality of lighting means, preferably a plurality of lighting means which directly adjoin one another and which can be actuated selectively, for example in order to present only certain selected information or in order to illuminate regions which can be delimited selectively from one another separately.

A further advantage of the described invention in general and of the embodiments shown in the figures is that the backlit trim fittings, as well as compatible, non-backlit trim fittings, can optionally be fitted onto the same carrier profile or sealing profile. The sealing function and optics or lighting function of the assembly are completely separate from one another, with the result that only the trim fitting assumes the optical function. The sealing profile does not have to be specifically prepared for the use of a backlit trim fitting or specially selected for this purpose.

For the vehicle manufacturer there is the possibility of giving the vehicle a significantly more high-quality appearance solely through the selection of the trim fitting 2 which is to be fitted onto the same sealing profile 1 for all the vehicle equipment level configurations, for example within the scope of a light assembly which is offered as a special accessory. In this way it is also possible for vehicles which originally have a non-backlit trim fitting to be easily retrofitted in a way which is particularly simple in terms of manual labour, without the need to replace the sealing profile.

LIST OF REFERENCE SYMBOLS

1 Sealing profile
2 Profiled strip
3 Upper visible edge
4 Lower visible edge

5 Main limb
6 Upper functional limb
7 Lower functional limb
8 Optical waveguide
9 Sealing strip limb
10 Light gap
11 Window pane
12 Vehicle outer surface
13 Decorative surface
14 Coating
15 Reflective surface
S Light gap width
A Distance from the optical waveguide to the visible edge
Z Decorative side
F Functional side

The invention claimed is:

1. An illuminated window channel cover trim fitting for a motor vehicle, wherein the trim fitting has a profiled strip manufactured from a non-light-transmissive material which cannot be through-lit, the profiled strip, given correct final mounting on the vehicle, defining a decorative side with a decorative surface which is directed away from the vehicle and which is bounded by a lower visible edge and defining a functional side which is directed towards the vehicle and on which at least one functional limb for engaging in a sealing profile is arranged, and wherein an optical waveguide is provided as lighting means on the functional side of the profiled strip without penetrating the profiled strip in a way visible from the outside in order to be able to backlight at least part of the profiled strip, wherein the trim fitting is embodied in such a way that, a light gap is partially bounded by the lower edge of the decorative surface of the trim fitting, through which light gap the light emitted by the lighting means is capable of exiting to the outside in a visible fashion.

2. The trim fitting according to claim 1, wherein, given correct final mounting on the functional side, the optical waveguide extends along at least part of the profiled strip, wherein the optical waveguide is arranged outside the profiled strip cross section and does not penetrate it.

3. The trim fitting according to claim 1, wherein the optical waveguide is held on the profiled strip on the functional side of the profiled strip.

4. The trim fitting according to claim 1, wherein a mount for the optical waveguide is provided on a limb, which bears the optical waveguide, of the profiled strip.

5. The trim fitting according to claim 4, wherein the mount is formed by a receptacle into which the optical waveguide can be clipped or bonded.

6. The trim fitting according to claim 1, wherein the profiled strip forms a profiled strip cross section with a main limb, the outwardly directed surface of which forms an externally visible decorative surface, and at least one functional limb which is arranged on the functional side, and wherein the optical waveguide is arranged on the functional side, on the inwardly directed surface of the main limb or of the functional limb.

7. The trim fitting according to claim 1, wherein the trim fitting is embodied in such a way that, given correct final mounting on the vehicle, the light gap is formed between a lower visible edge of the profiled strip and the adjacent vehicle outer surface.

8. The trim fitting according to claim 7, wherein the light gap is defined by a lower visible edge of the main limb.

9. The trim fitting according to claim 7, wherein the decorative surface is bounded by an upper visible edge and a lower visible edge.

10. The trim fitting according to claim 1, wherein the optical waveguide functions as a spacer element between the vehicle outer surface and the profiled strip, by means of which spacer element the profiled strip is supported, indirectly or directly on the vehicle outer surface, after correct final mounting on the vehicle.

11. The trim fitting according to claim 1, wherein the optical waveguide has a transparent or translucent sheath configured as a protective sheath and/or a sheath which determines the cross section and/or a sheath which influences the light beam.

12. An arrangement of a trim fitting according to claim 1 on a sealing profile wherein the sealing profile to which the profiled strip is attached given correct final mounting on the vehicle bears the optical waveguide.

13. The arrangement of a trim fitting on a sealing profile according to claim 12, wherein the optical waveguide is held in a mount provided in the sealing profile.

14. The arrangement of a trim fitting on a sealing profile according to claim 12, wherein the optical waveguide is integrated as a spacer element between the vehicle outer surface and the profiled strip in such a way that the profiled strip is supported, after correct final mounting on the vehicle, indirectly or directly on the vehicle outer surface via the optical waveguide.

15. A sealing profile for use with a trim fitting according to claim 1, wherein the sealing profile forms a mount for an optical waveguide which is to be inserted into the mount, wherein the mount is embodied in such a way that after insertion into the mount and after correct final fitting of the sealing profile and profiled strip on the vehicle the optical waveguide is capable of illuminating an air gap which is formed between the profiled strip fitted onto the sealing profile and the vehicle outer surface.

16. A profiled strip for a trim fitting according to claim 1, wherein a mount for an optical waveguide which is to be inserted into the mount is provided on the profiled strip, wherein the mount is embodied in such a way that after insertion into the mount and after correct final fitting of the sealing profile and trim fitting on the vehicle the optical waveguide is capable of illuminating a light gap formed between the trim fitting fitted onto the sealing profile and the vehicle outer surface.

17. The trim fitting according to claim 1, wherein the light gap is formed as an open gap.

18. The trim fitting according to claim 1, wherein the light gap is partially bounded by a body side of a motor vehicle.

19. An arrangement of a trim fitting according to claim 1 on a sealing profile wherein the optical waveguide is held in a mount provided by the profiled strip on the functional side of the profiled strip.

20. An arrangement of a trim fitting according to claim 19 wherein the light gap is formed as an open gap.

* * * * *